US011718124B2

(12) United States Patent
Gouerec

(10) Patent No.: US 11,718,124 B2
(45) Date of Patent: *Aug. 8, 2023

(54) BODY FOR A WRITING, TRACING, DRAWING OR COLORING PENCIL

(71) Applicant: Société BIC, Clichy (FR)

(72) Inventor: Julien Gouerec, Boulogne-sur-Mer (FR)

(73) Assignee: Société BIC, Clichy (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/274,325

(22) PCT Filed: Sep. 6, 2019

(86) PCT No.: PCT/EP2019/073816
§ 371 (c)(1),
(2) Date: Mar. 8, 2021

(87) PCT Pub. No.: WO2020/049148
PCT Pub. Date: Mar. 12, 2020

(65) Prior Publication Data
US 2021/0394549 A1    Dec. 23, 2021

(30) Foreign Application Priority Data
Sep. 7, 2018 (EP) .................... 18306178

(51) Int. Cl.
*B43K 19/14* (2006.01)
*C08L 67/04* (2006.01)

(52) U.S. Cl.
CPC .............. *B43K 19/14* (2013.01); *C08L 67/04* (2013.01)

(58) Field of Classification Search
CPC ................................. B43K 19/14; B43K 19/16
See application file for complete search history.

(56) References Cited

U.S. PATENT DOCUMENTS

| | | | | | |
|---|---|---|---|---|---|
| 3,704,071 | A | * | 11/1972 | Muller | B29C 44/507 264/173.17 |
| 5,916,950 | A | * | 6/1999 | Obuchi | C08L 67/02 528/359 |
| 6,669,771 | B2 | * | 12/2003 | Tokiwa | C08L 67/04 106/162.7 |
| 6,710,135 | B2 | * | 3/2004 | Tan | C08J 5/18 525/413 |
| 7,160,977 | B2 | * | 1/2007 | Hale | C08L 67/02 528/193 |
| 7,214,414 | B2 | * | 5/2007 | Khemani | C08L 67/02 524/556 |
| 7,449,510 | B2 | * | 11/2008 | Ueda | C08K 5/10 524/442 |
| 2009/0274920 | A1 | * | 11/2009 | Li | B32B 27/34 264/210.1 |
| 2012/0095169 | A1 | * | 4/2012 | Ogawa | C08G 63/912 525/450 |
| 2014/0162007 | A1 | | 6/2014 | Andreas | |
| 2020/0299504 | A1 | * | 9/2020 | Munoz | B65D 21/0209 |
| 2022/0048312 | A1 | * | 2/2022 | Gouerec | B43K 19/14 |

FOREIGN PATENT DOCUMENTS

| | | | |
|---|---|---|---|
| CN | 105907061 | | 8/2016 |
| CN | 105907061 A | * | 8/2016 |
| DE | 19855325 | | 6/1999 |
| EP | 0821036 | | 1/1998 |
| EP | 1072645 | | 1/2001 |
| EP | 2644407 | | 10/2013 |
| FR | 2988643 | | 10/2013 |
| JP | 11-309980 | | 11/1999 |
| JP | 2005-350530 | | 12/2005 |
| JP | 4895664 B2 | | 3/2012 |
| WO | 2013/013762 | | 1/2013 |

OTHER PUBLICATIONS

International Search Report dated Dec. 6, 2019 in related International PCT Patent Application No. PCT/EP2019/073817, 6 pgs.
Written Opinion dated Dec. 6, 2019 in related International PCT Patent Application No. PCT/EP2019/073817, 5 ogs.
Nobe et al., "Mechanical Properties and Morphology of Poly (Lactic Acid) Composites with Oyster Shell Particles", Advanced Materials Research, Trans Tech Publications Ltd, vol. 391-392, Dec. 1, 2012 (Dec. 1, 2012), ISSN:1022-6680, DOI:10.4028/www.scientific.net/amr (abstract & intro.).
International Search Report dated Dec. 2, 2019 in corresponding International PCT Patent Application No. PCT/EP2019/073816, 5 pgs.
Written Opinion dated Dec. 2, 2019 in corresponding International PCT Patent Application No. PCT/EP2019/073816, 5 pgs.
First Examination Report for corresponding Indian Application No. 202117001468, 7 pages, dated Sep. 19, 2022.

* cited by examiner

*Primary Examiner* — David P Angwin
*Assistant Examiner* — Bradley S Oliver
(74) *Attorney, Agent, or Firm* — Ruggiero, McAllister & McMahone LLC

(57) ABSTRACT

A body for a writing, tracing, drawing or coloring pencil has a composition that has, by weight, with respect to a total weight of the body between 50% and 95% of a mixture of polylactic acid and polybutylene succinate in a polylactic acid/polybutylene succinate ratio by weight of between 90/10 and 60/40 and between 5% and 50% of filler that includes an organic filler, such as wood fibers. A writing, tracing, drawing or coloring pencil includes such a body.

19 Claims, No Drawings

BODY FOR A WRITING, TRACING, DRAWING OR COLORING PENCIL

CROSS REFERENCE TO RELATED APPLICATIONS

This application is a National Stage Application of International Application No. PCT/EP2019/073816, filed on Sep. 6, 2019, now published as WO2020/049148 and which claims priority to EP18306178.7, filed on Sep. 7, 2018, the entire contents of each of which is incorporated herein by reference.

BACKGROUND OF THE DISCLOSURE

1. Field of the Disclosure

The present disclosure relates to polymer-based bodies for writing, tracing, drawing or coloring pencils.

Such bodies are intended to replace the wood material of conventional pencils and can also be known as "synthetic wood" or "synthetic body/core".

They make it possible to grasp the pencil and to protect the lead from breaking. They thus have to be resistant to deformation in order for it not to be possible to bend them or to twist them, which would break the lead on the inside. In addition, they have to be able to be sharpened by a conventional pencil sharpener. They are generally manufactured from a polymer-based synthetic material, the density and the ability to be sharpened of which are similar to those of wood, and can be extruded. They can be expanded.

In addition, they do not exhibit splinters if ever the pencil breaks since they are polymer-based.

Two main families of thermoplastic polymers are used to date in the synthetic body of pencils: styrene polymers, such as polystyrene (PS) and acrylonitrile/butadiene/styrene (ABS), and polyolefins, such as polyethylene (PE) and polypropylene (PP). These polymers all result from the petroleum industry. For ecological reasons, it would be advantageous to be able to replace such thermoplastic polymers with biodegradable polymers.

2. Description of Related Art

The patent application FR 2 988 643 thus describes a pencil, the body of which (known as casing part in the application) is based on expanded synthetic material. It teaches that the thermoplastic materials of the casing part and of the lead part can be chosen from styrene polymers, such as polystyrene, polyolefins and biopolymers. PLA (polylactic acid) is thus the only biopolymer cited, although the only example of pencil body in this patent application is based on polymer matrix of the family of the styrene polymers. In point of fact, as demonstrated in the comparative examples below, such a polymer, as a mixture with wood fibers, does not exhibit a very good impact strength.

The patent application DE19855325 describes a pencil body comprising biodegradable polymers and wood fibers. However, the biodegradable polymers described are not based on PLA or on PBS and can in particular be based on starch, such as the polymer Mater-Bi® sold by Novamont. In point of fact, as demonstrated in the comparative examples below, such a polymer, as a mixture with wood fibers, does not exhibit a very good impact strength.

Thus, the inventors have noticed that the use of PLA as sole thermoplastic polymer in the body of a pencil did not make it possible to obtain good mechanical properties with regard to the resilience and the impact strength, which may present problems in the manufacturing process and with regard to the ability of the final pencil to be sharpened. Thus, PLA "alone" does not make a good substitute for the polymers resulting from oil, such as polystyrene, in the manufacture of pencil bodies. It is the same for other biodegradable polymers, such as the starch-based polymer Mater-Bi® sold by Novamont. On the other hand, the inventors have noticed, surprisingly, that it was possible to manufacture pencil bodies having superior mechanical properties to polystyrene-based pencil bodies by using, as thermoplastic polymer, a mixture of PLA with PBS (polybutylene succinate), another biopolymer, in specific proportions, and by using an appropriate content of particular fillers, more specifically of organic fillers, even more specifically of wood fibers.

The application EP 0 821 036 describes a composition which can contain polylactic acid and PBS and which contains a filler and which can be used in various applications. However, pencil bodies are not indicated. In point of fact, pencil bodies have to be able to be sharpened and have to exhibit a good impact strength and a good flexural modulus, which is neither described nor suggested in this document. This document indicates the obligatory presence of crystalline inorganic fillers containing 10% by weight or more of $SiO_2$.

DETAILED DESCRIPTION

The present disclosure thus relates to a body for a writing, tracing, drawing or coloring pencil, the composition of which comprises (more specifically is essentially composed of, in particular consists of), by weight, with respect to the total weight of the body:
 a) between 50% and 95% of a mixture of polylactic acid and of polybutylene succinate in a polylactic acid/polybutylene succinate ratio by weight of between 90/10 and 60/40 and
 b) between 5% and 50% of filler,
 wherein the filler comprises an organic filler.

In a specific embodiment, its composition comprises (more specifically is essentially composed of, in particular consists in), by weight, with respect to the total weight of the body:
 a) between 70% and 90% of a mixture of polylactic acid and of polybutylene succinate in a polylactic acid/polybutylene succinate ratio by weight of between 80/20 and 65/45 and
 b) between 8% and 30% of filler,
 wherein the filler comprises an organic filler.

The pencil body according to the disclosure thus comprises a mixture of polylactic acid, for example commercially available from Natureplast, and of polybutylene succinate, for example commercially available from Natureplast, in a polylactic acid/polybutylene succinate ratio by weight of between 90/10 and 60/40, in particular between 80/20 and 65/45, more particularly between 80/20 and 70/30, more particularly still in a ratio by weight of 70/30.

This mixture of biodegradable thermoplastic polymers serves as matrix in the pencil body according to the disclosure and makes it possible to manufacture the pencil body by extrusion and to contribute good mechanical properties, such as impact strength and resilience. It also makes it possible to contribute the ability to be sharpened to the pencil body according to the disclosure.

The content of mixture of polylactic acid and of polybutylene succinate of the pencil body according to the disclosure is thus between 50% and 95%, more specifically between 60% and 92%, even more specifically between 70% and 90%, even more specifically still between 80% and 90%, by weight, with respect to the total weight of the body.

The pencil body according to the present disclosure additionally comprises a filler, which can be inorganic or organic. The filler makes it possible to improve the mechanical properties of the body, such as the (3-point) flexural modulus. More specifically, it is a filler of natural origin. More specifically, it is a filler of vegetable origin.

In particular the filler according to the disclosure comprises (more specifically is essential composed, or may consists in) an organic filler. More specifically the filler is wood fibers, for example in the powder form, in particular commercially available from JRS Rettenmaier or CFF GmbH & Co. KG or Jelu-Werk or Rossow. More specifically, the filler according to the present disclosure additionally comprises shellfish shells (such as oyster shells, in particular ground oyster shells, for example commercially available from Natureplast). The filler can thus consist of a mixture of wood fibers and of shellfish shells, in particular a mixture of wood fibers and of oyster shells, such as ground oyster shells.

More specifically shellfish shells, in particular oyster shells, even more specifically ground oyster shells, have a volume-average diameter (d50), ranging from 10 μm to 160 μm, in particular ranging from 20 μm to 100 μm, more particularly from 30 μm to 80 μm. The volume-average diameter (d50) can for example be measured by laser particle sizing with a Mastersizer 3000 type apparatus commercially available from Malvern.

The content of filler of the pencil body according to the disclosure is thus between 5% and 50%, more specifically between 7% and 40%, even more specifically between 8% and 30%, even more specifically still between 9% and 20%, in particular 10%, by weight, with respect to the total weight of the body.

In particular, in the case where the filler consists of wood fibers, its content is more specifically between 9% and 20%, even more specifically between 10% and 15%, in particular it is 10%, by weight, with respect to the total weight of the body.

In a specific embodiment, the filler does not comprise a crystalline inorganic filler containing more than 10% of $SiO_2$, in particular chosen from talc, kaolin, clays and kaolinite, more particularly as described in EPO 821 036.

In a particular embodiment, the filler does not comprise silicate, i.e. a salt combining silicon dioxide $SiO_2$ with metal oxides, such as aluminium oxides and/or magnesium oxides. More specifically still, the filler does not comprise silicon dioxide $SiO_2$. The pencil body according to the disclosure can additionally comprise an adhesion agent. If the adhesion agent is present, its content is between 0.1% and 10%, in particular between 1% and 6%, more particularly between 2% and 5%, by weight, with respect to the total weight of the body. More specifically, in the case where the filler consists of wood fibers, the content of adhesion agent is between 1% and 3% by weight, with respect to the total weight of the pencil body.

The adhesion agent makes it possible to improve the adhesion between the thermoplastic polymer (mixture of polylactic acid and of polybutylene succinate) and the filler, in particular when the filler has a high polarity, such as wood fibers.

Thus, in a specific embodiment of the pencil body according to the present disclosure, the filler consists of wood fibers, alone or as a mixture with shellfish shells, such as oyster shells, and the body comprises an adhesion agent.

In particular, the adhesion agent can be polylactic acid grafted by maleic anhydride, for example sold by Natureplast or Natureworks.

The pencil body according to the present disclosure can comprise other additives, such as, for example, dyes and/or pigments, in particular in the masterbatch form, for example based on PLA, blowing agents, processing aids, lubricants, slip agents, such as stearates (calcium stearate, for example) and/or a stearamide, modifiers of the performance of the PLA (melt enhancers, which improve the strength/consistency of the molten mixture in extrusion), in particular acrylics, and a mixture of these additives. The content of additive of the pencil body according to the present disclosure, when it is present, is between 0.1% and 10% by weight, with respect to the total weight of the body.

In particular, the pencil body according to the present disclosure comprises a blowing agent, such as, for example, azodicarbonamide, or other endothermic chemical agents, in order to lighten its final weight and to help in its ability to be sharpened, more specifically in a content of between 0.1% and 1%, even more specifically in a content of between 0.5% and 1%, by weight, with respect to the total weight of the body.

The pencil body according to the disclosure can also comprise dyes and/or pigments (such as red iron oxide), in particular in the masterbatch form, more particularly based on PLA. The content of dyes and/or pigments is in particular between 0.1% and 10% by weight, in particular if the dye and/or the pigment is not in the form of a masterbatch, between 0.1% and 5% by weight, more specifically between 0.5% and 3% by weight, with respect to the total weight of the pencil body according to the disclosure. In an advantageous embodiment, the dyes and/or the pigments make it possible to confer a color close to wood on the pencil body according to the disclosure.

The pencil body according to the present disclosure is more specifically extrudable.

It can also more specifically be sharpened and can in particular have the density and the ability to be sharpened similar to those of wood. More particularly, it can be sharpened by a conventional pencil sharpener.

It is thus not the body of a mechanical pencil.

In addition, the present disclosure relates to a writing, tracing, drawing or coloring pencil comprising the body according to the present disclosure.

It is not a mechanical pencil.

More specifically, in the pencil according to the disclosure, the body according to the present disclosure surrounds, in particular concentrically, the lead or an intermediate protective layer positioned between the lead and the body according to the disclosure.

In particular, the lead is a polymer-based lead and not a calcined lead.

More specifically, the pencil according to the disclosure is obtained by extrusion, in particular by coextrusion of the lead/optional protective layer/body according to the disclosure.

More specifically still, it is a graphite pencil or a colored pencil.

In a specific embodiment of the present disclosure, the pencil according to the disclosure comprises an additional decorative layer, more specifically of varnish, surrounding, in particular concentrically, the body according to the disclosure. More specifically, the decorative layer is made of a material compatible with that of the body according to the disclosure.

More specifically, the pencil according to the present disclosure can have a hexagonal, round or triangular section, more specifically a round or hexagonal section. More specifically, it can comprise a means for erasing, such as a rubber, at the non-sharpened end of the pencil.

A better understanding of the disclosure will be obtained on reading the description of the examples which follow.

EXAMPLES

Different compositions (examples 1 and 2 according to the disclosure, mixture of PLA and PBS without filler, polystyrenes of different categories) were tested, before and after extrusion, with regard to their mechanical properties. The flexural modulus of the pencil body has to be greater than or equal to 2000 MPa.

These compositions are prepared by compounding on a twin-screw extruder which will intimately mix the various ingredients of the formula, the operation being carried out at a temperature of 160° C. to 200° C. A formulated rod is obtained at the twin-screw extruder outlet, which rod is granulated. It is these small granules which are subsequently injection molded in the form of standardized test specimens.

The bending tests were carried out according to the standard NF EN ISO 178 of 2010 according to the following characteristics:

Equipment: testing device of 3367 type (Instron)
Force cell: 1 kN
Distance between supports: 64 mm
Test method: A
Test rate: 2 mm.min$^{-1}$
Sampling: Dumbbell test specimen ISO A
Number of test specimens tested: 10
Conditioning: minimum 24 h at 23° C.±2° C. and 50% RH±10% RH
Test temperature: 23.6° C.
Test hygrometry: 30%.
The unnotched Charpy impact tests were carried out according to the standard NF EN ISO 179-1 of 2010 according to the following characteristics:

Equipment: Impactor II pendulum (Ceast)
Hammer: 15 J
Distance of supports: 62 mm
Sampling: Type 1A test specimen (molded test specimen)
Positioning: Standing
Conditioning: minimum 24 h at 23° C.±2° C. and 50% RH±10% RH
Test temperature: 23.7° C.
Test hygrometry: 27%

The viscosity measurements (viscosity index of the material—Melt Flow Index: MFI) were carried out according to the standard NF EN ISO 1133 of 2011, method B, according to the following characteristics:

Stoving: 18 h at 90° C.
Equipment: Modular melt flow tester (Ceast)
Capillary die diameter: 2.095 mm
Capillary die length: 8 mm
Test temperature: 190° C.
Load applied: 2.16 kg
Time interval: 30 s The measurement of the density (MFI) was carried out according to the standard NF EN ISO 1183 of 2012, method A (method by immersion), according to the following characteristics:

Equipment: ALS/PLS-A01 precision balance (Kern)—density measurement attachments
Liquid: distilled water
Test temperature: 23° C.
Sampling: injected part The results are collated in the following tables 1 and 2:

TABLE 1

| Formulation | Mixture A 80% PLA + 20% PBS | Mixture B 70% PLA + 30% PBS | Recycled PS | Virgin HIPS | Virgin GPPS |
|---|---|---|---|---|---|
| Performance qualities of the composition before extrusion | | | | | |
| Flexural modulus (MPa) | 2869 | 2557 | 1500 | 1850 | 2900 |
| Impact strength (kJ/m$^2$) | 32.7 | 63.8 | [8]* | [11]* | 8 |
| MFI (g/10 min) (200° C. - 5 kg) | 12.26 | 18.29 | 5 | 4.5 | 4 |
| MFI (g/10 min) (190° C. - 2.16 kg) | 3.2 | 3.91 | — | — | — |
| Density (g/cm$^3$) | 1.25 | 1.26 | 1.04 | 1.04 | 1.05 |
| Performance qualities of the extruded rods | | | | | |
| Resistance to sharpening (N · mm) | — | — | 150 | — | — |
| Breaking force (daN) | — | 25.69 | 11.70 | — | — |
| Elongation (mm) | — | 4.86 | 12.50 | — | — |
| Diameter (mm) | 7.4 | 7.7 | 7.3 | | |

*these values were produced on notched test specimens (Charpy impact tests) according to the standard NF EN ISO 179-1 of 2010

TABLE 2

| Formulation | Example 1: 90% Mixture B + 10% wood fibers | Example 2: 80% Mixture B + 10% wood fibers + 10% adhesion agent: PLA grafted by maleic anhydride |
|---|---|---|
| Performance qualities of the composition before extrusion | | |
| Flexural modulus (MPa) | 3468 | 3553 |
| Impact strength (kJ/m$^2$) | 23.7 | 21.8 |
| MFI (g/10 min) | 17.76 | 46 |

TABLE 2-continued

| Formulation | Example 1: 90% Mixture B + 10% wood fibers | Example 2: 80% Mixture B + 10% wood fibers + 10% adhesion agent: PLA grafted by maleic anhydride |
|---|---|---|
| (200° C. - 5 kg) MFI (g/10 min) | | |
| (190° C. - 2.16 kg) | 2.79 | 6.57 |
| Density (g/cm$^3$) | 1.2 | 1.2 |
| Performance qualities of the extruded rods | | |
| Resistance to sharpening (N · mm) | 160 | — |

TABLE 2-continued

| Formulation | Example 1: 90% Mixture B + 10% wood fibers | Example 2: 80% Mixture B + 10% wood fibers + 10% adhesion agent: PLA grafted by maleic anhydride |
|---|---|---|
| Breaking force (daN) | 15.00 | 20.30 |
| Elongation (mm) | 3.93 | 4.40 |
| Diameter (mm) | 6.5 | 7 |

The results clearly show superior mechanical properties of the examples according to the disclosure in comparison with polystyrene, and even of the filler-free PLA/PBS mixtures in comparison with polystyrene.

Pencils of hexagonal section were manufactured by coextrusion with a polypropylene-based graphite lead (composition as % by weight with respect to the total weight of the lead: 26% polypropylene, 8% kaolin, 47% graphite, 9% black pigment coated with polyethylene wax, 8% calcium stearate, 2% additive) or a colored lead based on styrene polymer, a sheath, a body having the composition according to example 1 and a varnish. The thickness of the body is 3.5 mm in the case of the colored leads and 4.5 mm in the case of the graphite leads.

The pencils obtained are comparable dimensionally and with regard to weight with the conventional pencils having a graphite or colored lead, the body of which is made of polystyrene.

In addition, the processability with the wood fibers is good.

The use of wood fibers thus makes it possible to obtain a good resistance of the pencil and a not excessively high sharpening effort.

Furthermore, no problem is observed with regard to the lead during the operation of sharpening the pencil: the lead does not break and does not become detached from the pencil.

Different compositions (mixture of PLA and PBS with kaolin as filler (comparative example 3), mixture of another starch-based biodegradable polymer Mater-Bi® sold by Novamont with, as filler, wood fibers (comparative example 1), mixture of PLA alone with, as filler, wood fibers (comparative example 2)) were tested, before extrusion, with regard to their mechanical properties.

These compositions are prepared by compounding on a twin-screw extruder which will intimately mix the various ingredients of the formula, the operation being carried out at a temperature of 160° C. to 200° C. A formulated rod is obtained at the twin-screw extruder outlet, which rod is granulated. It is these small granules which are subsequently injection molded in the form of standardized test specimens.

The bending and impact strength tests were carried out using the same protocol as the above examples. The results are collated in table 3 below.

TABLE 3

| Formulation | Comparative Example 3: 90% Mixture B + 10% kaolin | Comparative example 1: 90% Mater-Bi ® + 10% wood fibers | Comparative example 2: 90% PLA + 10% wood fibers |
|---|---|---|---|
| Performance qualities of the composition before extrusion | | | |
| Flexural modulus (MPa) | 2936 | 3235 | 4411 |
| Impact strength (kJ/m$^2$) | 27.5 | 17.3 | 13.2 |

It is noticed that the impact strength of comparative examples 1 and 2 is less than that of example 1 according to the disclosure and that the flexural modulus of comparative example 3 is less than that of example 1.

The use of other biopolymers, such as Mater-Bi® from Novamont or PLA, alone or of fillers containing SiO$_2$, such as kaolin, thus gives poorer results than the PLA/PBS mixture with, as filler, wood fibers.

The invention claimed is:

1. A pencil body for a writing, tracing, drawing or coloring pencil, the body having a composition comprising, by weight, with respect to a total weight of the body:
    between 50% and 95% of a mixture of polylactic acid and polybutylene succinate in a ratio by weight of polylactic acid/polybutylene succinate that is between 90/10 and 60/40 and
    between 5% and 50% of a filler that comprises an organic filler and does not comprise SiO$_2$.

2. The pencil body as claimed in claim 1, wherein the ratio by weight of polylactic acid/polybutylene succinate is between 80/20 and 65/45.

3. The body as claimed in claim 1, wherein the composition comprises, by weight, with respect to the total weight of the body:
    between 70% and 90% of a mixture of polylactic acid and polybutylene succinate in a ratio by weight of polylactic acid/polybutylene succinate that is between 80/20 and 65/45 and
    between 10% and 30% of the filler.

4. The pencil body as claimed in claim 1, wherein the filler is wood fibers.

5. The pencil body as claimed in claim 1, wherein the filler comprises shellfish shells.

6. The pencil body as claimed in claim 1, wherein the filler comprises ground oyster shells.

7. The pencil body as claimed in claim 1, wherein the filler is between 7 and 40%.

8. The pencil body as claimed in claim 1, wherein the filler is between 8 and 30%.

9. The pencil body as claimed in claim 1, wherein the filler is between 9 and 20%.

10. The pencil body as claimed in claim 1, wherein the filler is 10%.

11. The pencil body as claimed in claim 1, wherein the mixture of polylactic acid/polybutylene succinate is in a ratio between 80/20 and 70/30.

12. The pencil body as claimed in claim 1, wherein the composition further comprises between 0.1% and 10% by weight of an adhesion agent, with respect to the total weight of the body.

13. The pencil body as claimed in claim 12, wherein the adhesion agent is polylactic acid grafted by maleic anhydride.

14. The pencil body as claimed in claim 1, wherein the composition further comprises between 0.1% and 10% by weight of an additive, with respect to the total weight of the body.

15. The pencil body as claimed in claim 14, wherein the additive is an additive selected from the group consisting of: dyes and/or pigments, blowing agents, processing aids, lubricants, slip agents, modifiers of the performance of the polylactic acid and their mixtures.

16. The pencil body as claimed in claim 1, wherein the pencil body is extrudable.

17. A writing, tracing, drawing or coloring pencil comprising the pencil body as claimed in claim 1.

18. The pencil as claimed in claim 17, wherein the pencil is obtained by extrusion.

19. The pencil as claimed in claim 17, wherein the pencil is a graphite pencil or a colored pencil.

\* \* \* \* \*